(12) United States Patent
Kunc et al.

(10) Patent No.: US 9,294,137 B2
(45) Date of Patent: Mar. 22, 2016

(54) METHOD FOR REDUCING AMPLITUDE NOISE IN A RECEIVED SIGNAL WITHIN AN RFID INTERROGATOR

(71) Applicant: ams R&D analogni polprevodniki, d.o.o., Ljubljana (SI)

(72) Inventors: Vinko Kunc, Ljubljana (SI); Jernej Rozman, Ravne Na Koroskem (SI); Maja Atanasijevic-Kunc, Ljubljana (SI)

(73) Assignee: AMS R&D ANALOGNI POLPREVODNIKI, D.O.O., Ljubljana (SI)

( * ) Notice: Subject to any disclaimer, the term of this patent is extended or adjusted under 35 U.S.C. 154(b) by 75 days.

(21) Appl. No.: 14/361,697

(22) PCT Filed: Nov. 29, 2012

(86) PCT No.: PCT/SI2012/000062
§ 371 (c)(1),
(2) Date: May 29, 2014

(87) PCT Pub. No.: WO2013/081557
PCT Pub. Date: Jun. 6, 2013

(65) Prior Publication Data
US 2014/0335813 A1   Nov. 13, 2014

(30) Foreign Application Priority Data
Nov. 30, 2011  (SI) .................................. 201100450

(51) Int. Cl.
*H04B 1/10* (2006.01)
*H04B 1/04* (2006.01)
*H04B 1/22* (2006.01)
*H04B 1/24* (2006.01)

(52) U.S. Cl.
CPC ............ *H04B 1/1027* (2013.01); *H04B 1/0475* (2013.01); *H04B 1/109* (2013.01); *H04B 1/22* (2013.01); *H04B 1/24* (2013.01)

(58) Field of Classification Search
CPC ....................................................... H04B 1/1027
USPC ............................................................ 455/312
See application file for complete search history.

(56) References Cited

U.S. PATENT DOCUMENTS 8,260,241 B1 * 9/2012 Hyde ............................ 455/296
8,798,198 B2 * 8/2014 Do ................................. 375/297

(Continued)

FOREIGN PATENT DOCUMENTS

WO   2007/027885 A2   3/2007
WO   2009/128791 A1   10/2009

*Primary Examiner* — Sanh Phu
(74) *Attorney, Agent, or Firm* — McDermott Will & Emery LLP

(57) ABSTRACT

A method is performed for a signal transmitted by an RFID interrogator being a radiofrequency electromagnetic sine wave. An amplitude noise contribution $RSd_{AN}$ to a demodulated received signal RSd within a frequency interval of a low-pass filter is determined by means of a measured demodulated transmitted signal TSd as $RSd_{AN} = k \cdot TSd$ in that a dc component $DC_{RS}$ in said demodulated received signal RSd and a dc component $DC_{TS}$ in said demodulated transmitted signal TSd are measured and a conversion factor k is determined as $k = DC_{RS} : DC_{TS}$. A receiver output signal O is continuously generated out of the received signal by subtracting said amplitude noise contribution $RSd_{AN}$ from the demodulated received signal RSd, filtering the cleaned signal $RSd - k \cdot TSd$ by the low-pass filter and amplifying it. The conversion factor is determined in an exceptionally simplified way as said ratio of said dc components. No receiving interruptions are needed.

10 Claims, 3 Drawing Sheets

(56) References Cited

U.S. PATENT DOCUMENTS

Figure 1A:
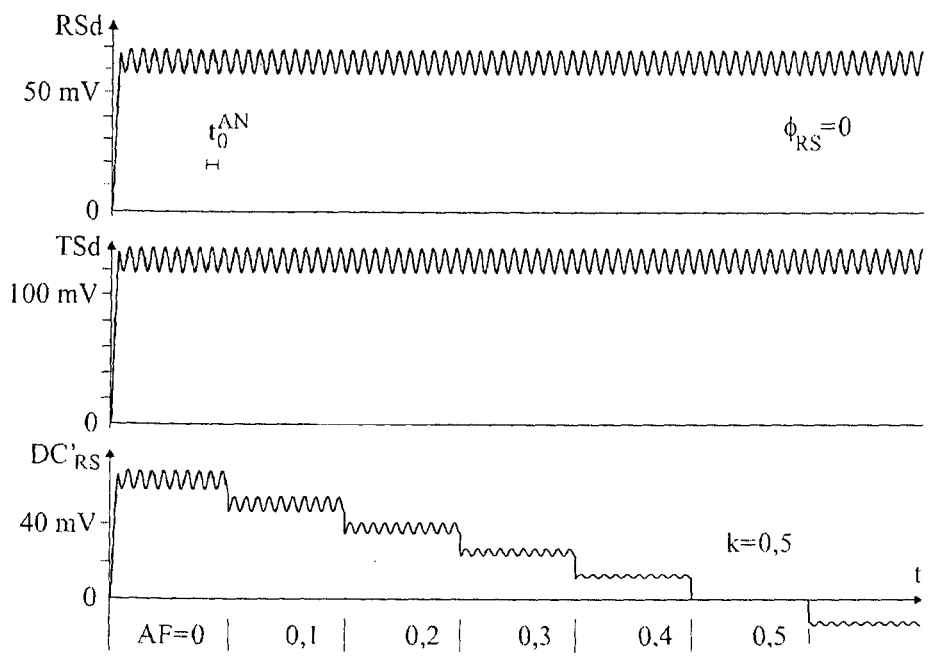

| | | | |
|---|---|---|---|
| 8,867,989 B2 * | 10/2014 | Kunc et al. | 455/41.1 |
| 2006/0186995 A1 | 8/2006 | Wu et al. | |
| 2009/0196373 A1 * | 8/2009 | Snook | 375/269 |
| 2011/0032080 A1 | 2/2011 | Kunc et al. | |

* cited by examiner ved by an RFID interrogator and said method is carried out when said interrogator trans-
mits a radiofrequency electromagnetic sine wave, the pro-
posed solution being above all intended for the RFID inter-
rogators in the UHF band.

METHOD FOR REDUCING AMPLITUDE NOISE IN A RECEIVED SIGNAL WITHIN AN RFID INTERROGATOR

The invention relates to a method for reducing an ampli-
tude noise originating from an RFID interrogator transmitter
and appearing in a signal received by the RFID interrogator
and said method is carried out when said interrogator trans-
mits a radiofrequency electromagnetic sine wave, the pro-
posed solution being above all intended for the RFID inter-
rogators in the UHF band.

A demodulation of a received signal in the UHF band
having frequencies of about 900 MHz is mostly carried out by
combining with two output signals of an interrogator local
oscillator said two signals being in quadrature to each other
(US 2006/0186995 A1) for signal to be efficiently received
irrespective of its phase in a location of an interrogator
antenna. Thereafter, the demodulated signals are cleaned by
means of low-pass filters of high-frequency noise compo-
nents as well as a direct-current component and are amplified.
The stronger of both signals is selected, digitized and con-
ducted to a communication controller circuit. Since a cou-
pling circuit connects a transmitter to the antenna and the
antenna to a receiver, and the interrogator must transmit a
radiofrequency electromagnetic sine wave also when receiv-
ing a label signal in order to deliver a supply energy flux to
said label, a noise of the interrogator transmitter is transferred
to the interrogator receiver along said two paths besides other
noise, as well.

A noise inherent in an electronic circuit of the interrogator
receiver, when calculated with respect to its input, generates
an effective voltage of 5 nV per 1 Hz wide frequency band in
the mentioned frequency range but a noise of a high-class
signal generator is typically 120 dBc meaning an effective
voltage 7 µV on 50Ω per 1 Hz wide frequency band at a power
of 1 W. A signal of said radiofrequency electromagnetic sine
wave at the output of the interrogator transmitter has power
ranging from 100 mW to 1 W. The noise of the transmitter
carrier signal is a significant or even prevailing noise in the
interrogator receiver, because the electronic circuit therein
can be produced in said frequency range in such manner that
it will have a substantially lower noise.

The noise of the transmitter signal and therefore the noise
of the receiver signal of the RFID interrogator too is com-
posed of a phase noise and an amplitude noise. The phase
noise in the received signal does not contribute to a noise in
the receiver output signal, because both mixer stages at the
receiver input use two output signals in quadrature to each
other of the same local oscillator which also generates the
transmitted carrier signal. The amplitude noise of the trans-
mitter signal, however, strongly contributes to a noise in the
receiver output signal. Its amplitude is also determined by a
difference in the phase at a mixer input between the received
signal and either of local oscillator signals being in quadra-
ture to each other.

Based on these considerations, there have been proposed
(PCT/SI2008/000025) a method and a circuit for reducing an
interrogator amplitude noise in a signal received by an RFID
interrogator. A calibrating signal is generated in an interroga-
tor transmitter in that a signal of a local oscillator is shallowly
amplitude-modulated with a pilot signal. A pilot signal fre-
quency nearly equals the frequency, at which a label encodes
data. An interrogator receiver reference signal is generated by
combining the transmitter calibrating signal with a signal,
whose carrier signal has a frequency equaling the frequency
of the local oscillator signal, conducting the combined signal
through a low-pass filter and amplifying it. After a demodu-
lation with two output signals of a local oscillator being in
quadrature to each other, receiver output signals are cleaned
by subtracting from them the receiver reference signal, which
has been attenuated by a calibrated attenuation factor and has
a calibrated polarity. The attenuation factor of the reference
signal and its polarity are mutually independently calibrated
for both receiver output signals by determining and setting the
attenuation factor and the polarity of the receiver reference
signal as a pair of values for either receiver output signal, at
which pair of values cleaned received signals have the lowest
amplitude. The output signal of the interrogator receiver has
an improved signal-to-noise ratio indeed since it no more
comprises the amplitude noise of the interrogator transmitter
but said calibration interrupts the receiving of the label signal.

The technical problem to be solved by the present invention
is to propose, on the basis of fundamental properties of a
demodulated transmitted signal and a demodulated received
signal, such method to be carried out by an RFID interrogator
that a contribution of an amplitude noise to said demodulated
transmitted signal from an interrogator transmitter will be
immediately determined without interrupting a receiving and
said amplitude noise contribution will be then immediately
subtracted from said demodulated received signal.

Said technical problem is solved by the method of the
invention for reducing an amplitude noise in a received signal
within an RFID interrogator as characterized by the features
of the first claim. Dependent claims, however, characterize
the variants of the embodiment of this method.

The method of the invention for reducing an amplitude
noise in a received signal within an RFID interrogator distin-
guishes itself in that a conversion factor between amplitude
noise contributions to a demodulated received signal and a
demodulated transmitted signal is determined in an excep-
tionally simplified way since a ratio of direct-current compo-
nents present in said two signals has to be only determined
each time and there is no need any more to measure an
amplitude of a signal having a pilot frequency as it was at the
known technical solution.

The conversion factor is immediately determined in a way
free from unwanted signals in the receiving because no
receiving interruptions in particular time windows are
needed. Additionally, the conversion factor is automatically
adjusted to instantaneous conditions during the receiving.

Figure 1B:
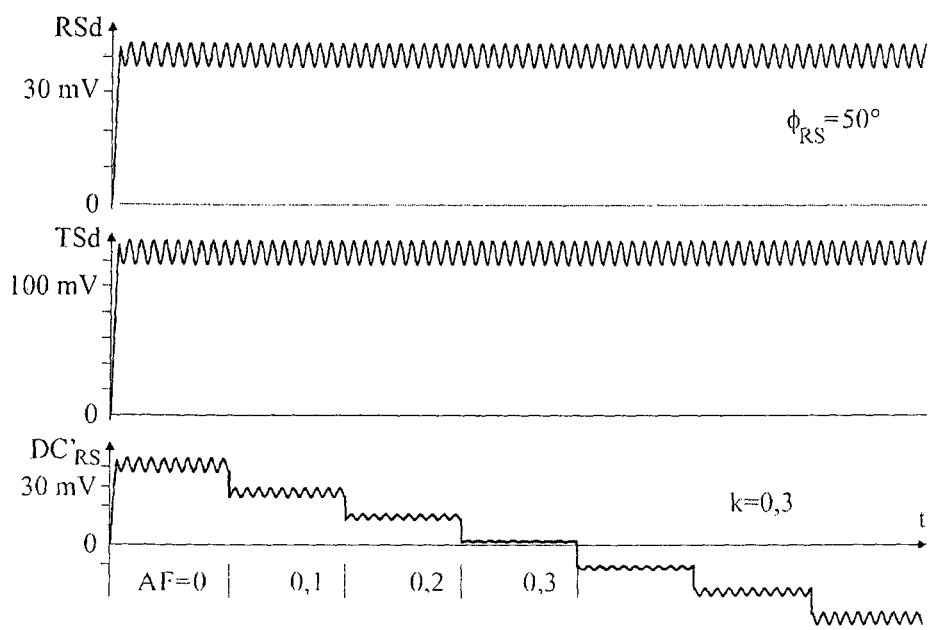
Figure 2A:
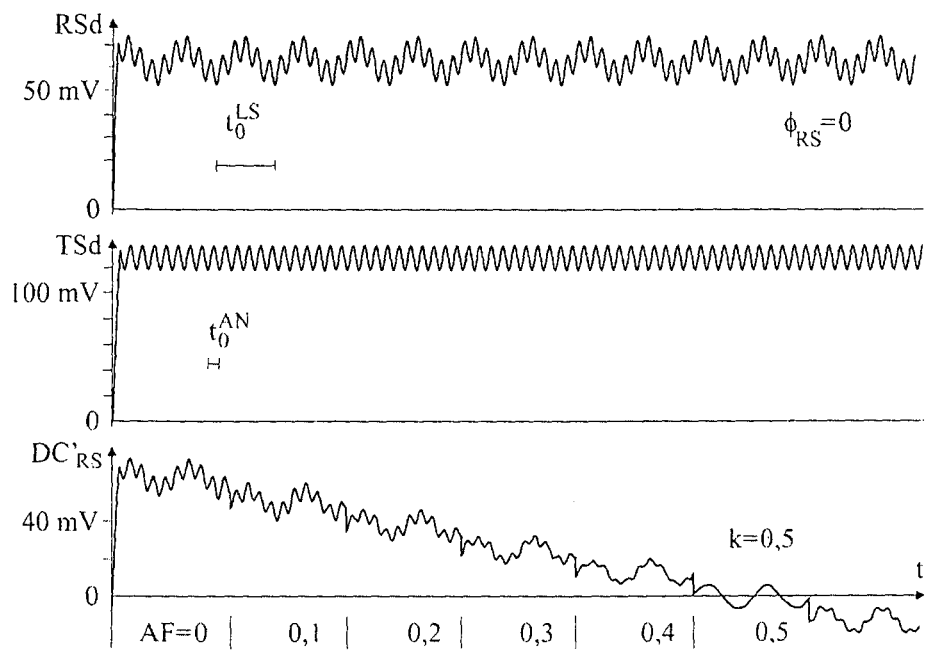
Figure 2B:
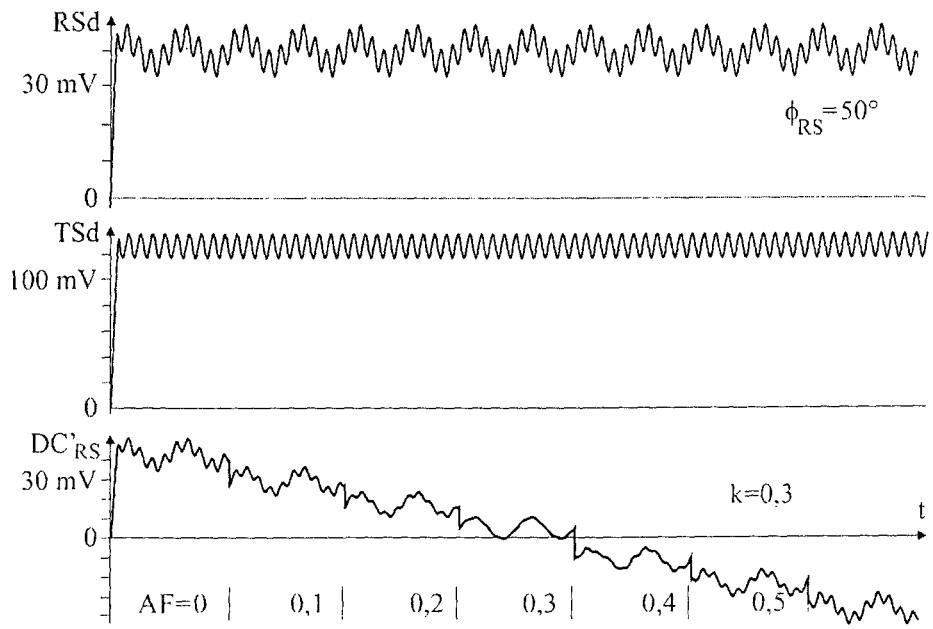

The invention will now be disclosed in detail by way of
describing embodiments of the method of the invention and
with reference to the accompanying drawing representing in:

FIGS. 1a and 1b a stepwise eliminating of a contribution of
said amplitude noise to a demodulated received signal when
receiving a transmitted signal, which is reflected off interro-
gator surroundings, hence in the absence of an RFID label,
where simulations of a demodulated transmitted signal as
well as a demodulated received signal are used, in fact for two
phase shifts of a carrier wave in the received signal with
respect to a demodulating oscillator signal, and FIGS. 2a and 2b similarly as in FIGS. 1a and 1b but for the
case of also receiving a signal transmitted by an RFID label
and FIG. 3a block diagram of a transmitter circuit, a receiving
circuit and an amplitude-noise eliminating circuit according
to the method of the invention.

The following fundamental consideration of contributions
of a transmitter amplitude noise AN to two demodulated
signals gives rise to an improvement of a method as disclosed
in patent application PCT/SI2008/000025 for reducing the
amplitude noise in a signal received by an RFID interrogator.
A demodulated transmitter output signal TSd being transmitted at the time t and a demodulated signal RSd being received at the same time t are inspected.

A transmitter output signal TS is a radiofrequency electromagnetic sine wave generated by an RFID interrogator transmitter in order to supply power to a label and to acquire data therefrom. The transmitter amplitude noise AN is superposed upon said transmitter output signal TS.

Figure 3:
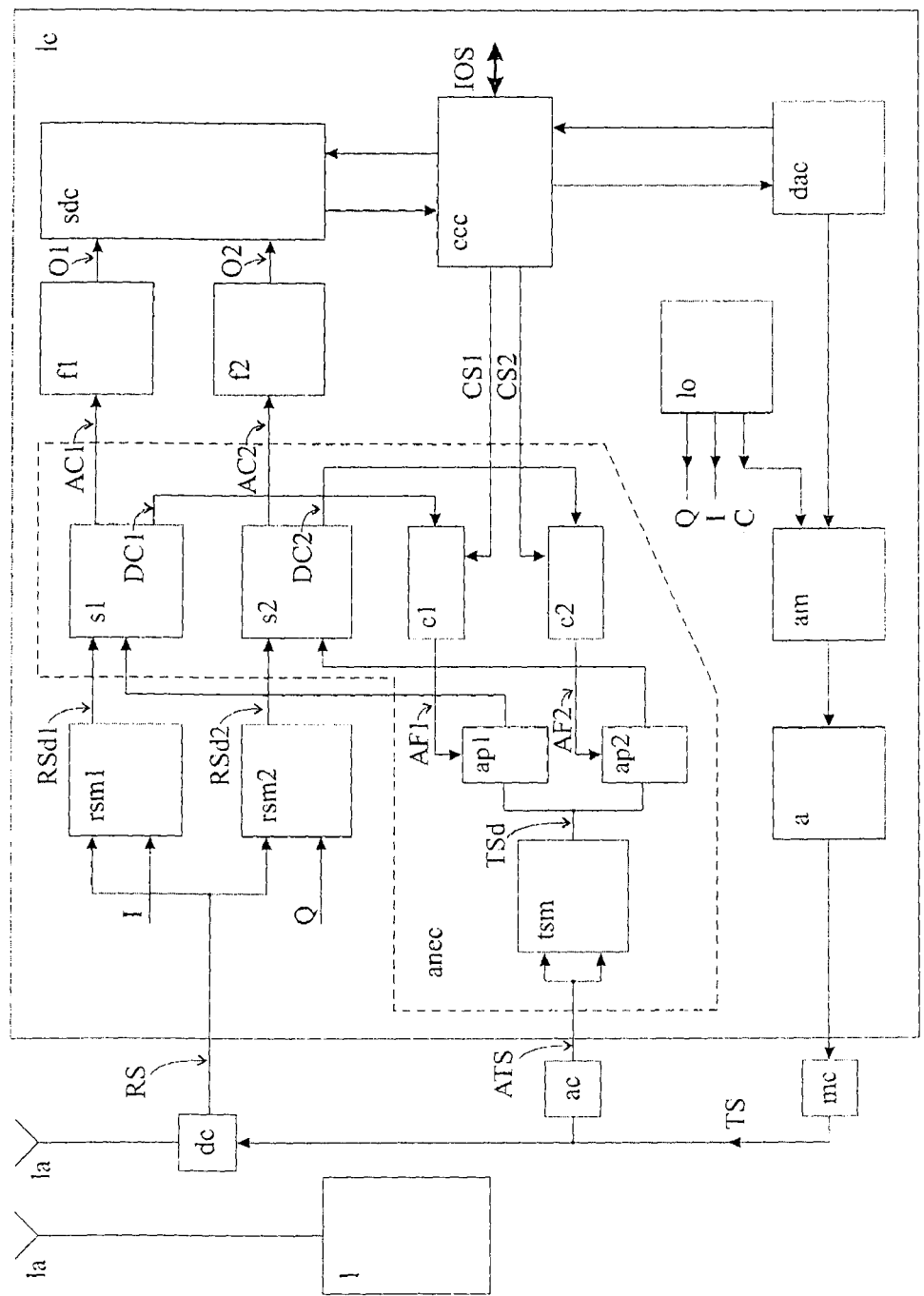

The transmitter output signal TS has an angular frequency ω, which is an angular frequency of a signal from an interrogator local oscillator lo (FIG. 3). Let us suppose that, at an input of a mixer tsm foreseen to demodulate said transmitted signal TS, the transmitter output signal TS leads said local oscillator signal by a phase angle $\Phi_{TS}$. Said demodulation is carried out by means of said local oscillator signal.

If the amplitude noise AN is a harmonic signal with an angular frequency $\omega_{AN}$, the transmitted signal TS encumbered with said amplitude noise AN is represented by a signal with an amplitude time dependence being expressed as $$(1+\sin \omega_{AN} t)\cdot \sin \omega t.$$

Hence such signal is composed of the following three harmonic components:

$$\sin \omega t, \sin(\omega+\omega_{AN})t \text{ and } \sin(\omega-\omega_{AN})t.$$

When freed from components with an angular frequency 2ω the transmitted signal TSd being demodulated with said local oscillator signal reads at the time t:

$$k_{TS}[\sin \omega t+\sin(\omega+\omega_{AN})t+\sin(\omega-\omega_{AN})t]\cdot \sin(\omega t-\Phi_{TS})\approx \tfrac{1}{2}k_{TS}\cos \Phi_{TS}+k_{TS}\cos \Phi_{TS}\cdot \cos \omega_{AN}t. \quad (1a)$$

Here $k_{TS}$ means an amplitude factor of the transmitted signal TS.

The demodulated transmitted signal TSd may be therefore written as a sum of a direct-current component $DC_{TS}$ and an alternating-current component:

$$TSd=DC_{TS}+AC_{TS,AN}. \quad (1)$$

Said alternating-current component $AC_{TS,AN}$ originates from said amplitude noise AN.

At an input of a mixer rsm foreseen to demodulate a received signal RS, which results from the transmitted signal TS reflected off an object in interrogator surroundings, a first part of said received signal RS leads said local oscillator signal—by means of said signal also this demodulation is carried out—by a phase angle $\Phi_{RS}$, whereas a second part of the received signal RS results from a reflection off an interrogator antenna ia and a third part of the received signal RS results from a crosstalk within a directional coupler dc, however, the phase angles of the last two signals are much smaller.

The phase angle $\Phi_{RS}$ exceeds the phase angle $\Phi_{TS}$ by a phase difference, which at the frequency of the interrogator local oscillator lo corresponds to a time Δt of a signal flight from the RFID interrogator antenna ia to a label antenna la and backwards. In spite of a very short distance between the RFID interrogator and the label being in the range of 1 centimeter, said phase difference amounts to at least about π/10 for the radiofrequency electromagnetic sine wave having the frequency of 900 MHz, however, it is negligible for the amplitude noise AN at frequencies of about 1 MHz.

When the received signal RS only results from the three contributions mentioned above, as no RFID label is present in said surroundings at that time and the received signal RS is therefore not modulated by a label modulating signal LS, the received signal RSd being demodulated with said local oscillator signal and freed from components with said angular frequency 2ω reads at the time t:

$$k_{RS}[\sin \omega t+\sin(\omega+\omega_{AN})t+\sin(\omega-\omega_{AN})t]\cdot \sin(\omega t-\Phi_{RS})\approx \tfrac{1}{2}k_{RS}\cos \Phi_{RS}+k_{RS}\cos \Phi_{RS}\cdot \cos \omega_{AN}t. \quad (2a)$$

Here $k_{RS}$ means an amplitude factor of the received signal RS.

However, when the received signal RS also arrives from a label 1 the demodulated received signal RSd is a sum of a measured direct-current component $DC_{RS}$ and of two alternating-current components:

$$RSd=DC_{RS}+AC_{RS,AN}+AC_{RS,LS}; \quad (2)$$

said alternating-current component $AC_{RS,AN}$ originates from the amplitude noise AN and said alternating-current component $AC_{RS,LS}$ from said modulating signal LS of the label 1.

An equality of mutual ratios for the direct-current components $DC_{RS}$ and $DC_{TS}$ and for the alternating-current components $AC_{RS,AN}$ and $AC_{RS,AN}$, said equality being evident from the expressions (1a) and (2a), enables a following rule to deal with eliminating the amplitude noise AN from the received signal RS.

The contribution $AC_{RS,AN}$ of the amplitude noise AN to the demodulated transmitted signal TSd is being immediately determined in the interrogator circuit. The contribution $AC_{RS,AN}$ of the amplitude noise AN to the demodulated received signal RSd is a k-fold thereof:

$$AC_{RS,AN}=k\cdot AC_{TS,AN}.$$

It is evident from the expressions (1a) and (2a) that the conversion factor k is determined as:

$$k=k_{RS}\cos \Phi_{RS}/k_{TS}\cos \Phi_{TS}. \quad (3a)$$

The conversion factor k therefore equals to the ratio of the time-independent summands in the expressions (1a) and (2a) or, expressed with quantities measured in real time, to the ratio of the measured direct-current component $DC_{RS}$ in the demodulated received signal RSd and the measured direct-current component $DC_{TS}$ in the demodulated transmitted signal TSd:

$$k=DC_{RS}/DC_{TS}. \quad (3)$$

The contribution $AC_{RS,AN}$ of the amplitude noise AN to the demodulated received signal RSd may be immediately calculated and eliminated from the demodulated received signal RSd.

The values of the direct-current components $DC_{RS}$ and $DC_{TS}$ and therefore also of the conversion factor k depend on the phase angle $\Phi_{RS}$ and the phase angle $\Phi_{TS}$.

The receiving according to the state of the art is interrupted in order to determine the contribution of the amplitude noise AN in the demodulated transmitted signal TSd by means of a pilot signal. However, the above fundamental consideration demonstrates that the amplitude noise AN of the interrogator transmitter can be eliminated immediately, i.e. in real time, and without interrupting the receiving, i.e. by means of values of the demodulated transmitted signal TSd and the direct-current component of the demodulated transmitted signal TSd as well as the direct-current component of the demodulated received signal RSd, all of them being immediately determined during receiving the label signal.

Said observation is applied to the method being carried out in the RFID interrogator for reducing the amplitude noise AN in the received signal RS when the transmitted signal TS of the interrogator is the radio frequency electromagnetic sine wave.

The interrogator local oscillator lo generates several output signals having the same frequency; a first output signal is a carrier signal C of the transmitter output signal TS.

The received signal RS is actually processed by the RFID interrogator in two parallel channels. A first receiver output signal O1 is generated in that the received signal RS is mixed with a second output signal I of the local oscillator lo, the amplitude noise AN is eliminated according to the method of the invention and the cleaned signal is then conducted through a first low-pass filter f1 eliminating a component with the twofold local oscillator frequency and is amplified. A second receiver output signal O2 is generated in that the received signal RS is mixed with a third output signal Q of the local oscillator lo being in quadrature to the second output signal I of the local oscillator lo, the amplitude noise AN is eliminated according to the method of the invention, the signal is then conducted through a second low-pass filter f2 and is amplified.

The stronger one of said receiver output signals O1, O2 is selected and digitized. This signal is then conducted to a communication controller circuit ccc, which receives/transmits input/output signals IOS and communicates with a transmitter digital-to-analogue converter circuit dac.

According to the invention, the method for reducing the amplitude noise AN originating from the RFID interrogator transmitter and appearing in the signal RS received by the RFID interrogator is characterized by the following steps.

In either parallel channel, the channel labelling is now omitted, within the frequency interval of said low-pass filter at the output of the interrogator receiver circuit, the channel contribution $RSd_{AN}$ of the amplitude noise AN to the demodulated received signal RSd is determined by means of the measured demodulated transmitted signal TSd, actually as a part of said demodulated transmitted signal TSd, in the following way:

$$RSd_{AN}=k.TSd.$$

The conversion factor k being also provided with a sign in the above expression is determined according to (3) as:

$$k=DC_{RS}:DC_{TS}.$$

To this end the direct-current component $DC_{RS}$ in the demodulated received signal RSd as well as the direct-current component $DC_{TS}$ in the demodulated transmitted signal TSd and the demodulated transmitted signal TSd are measured.

Consequently, the receiver output signal O is generated out of the received signal RS in that said contribution $RSd_{AN}$ to the amplitude noise AN is subtracted from the demodulated received signal RSd. The signal RSd-k.TSd cleaned in this way is filtered by said low-pass filter and amplified.

The contribution $RSd_{AN}$ of the amplitude noise AN to the demodulated received signal RSd is determined in a normal rhythm.

The normal rhythm is selected so that its period is at least twice the period corresponding to a medium frequency of said low-pass filter. An order of magnitude of said period ranges from several microseconds to several tens of microseconds when the RFID interrogator in the UHF range with frequency of about 900 MHz demodulates the received signal.

After the RFID interrogator has been turned on or has started transmitting the radiofrequency electromagnetic sine wave the direct-current component $DC_{RS}$ in the demodulated received signal RSd and the direct-current component $DC_{TS}$ in the demodulated transmitted signal TSd are measured in said normal rhythm. The conversion factor k is determined as $k=DC_{RS}:DC_{TS}$ in this normal rhythm each time in a way chosen with respect to the embodiment. The receiver output signal O is uninterruptedly generated.

According to the invention, the conversion factor k is determined by means of an algorithm, which produces its value with respect to the values of both direct-current components $DC_{RS}$ and $DC_{TS}$.

According to the invention, the conversion factor k may also be determined in that the attenuation factor AF, by which the direct-current component $DC_{TS}$ of the demodulated transmitted signal TSd is attenuated, stepwise increases in the normal rhythm, e.g. by 0.1, from an initial value 0 (FIGS. 1a, 1b, 2a and 2b). Said direct-current component $DC_{TS}$ in each step attenuated by the attenuation factor AF appropriate to said step is subtracted from the demodulated received signal RSd so many times until the direct-current component of the difference RSd−AF.TSd becomes closest to zero. The value of the attenuation factor AF from that step is thereafter retained as an approximation of the conversion factor k so far the value of said difference RSd−AF.TSd will not move away from value 0. This is checked from time to time.

Determining the conversion factor k is simple, not time consuming and no convergence problems arise nor a special time window is needed, in which the transmitting would be interrupted. Hence nothing needs to be set anymore on the system level nor a compromise needs to be found about when and how often the conversion factor k should be determined.

According to the invention, the conversion factor k may be determined in the rhythm being slower than the normal rhythm while the receiver output signal O is continuously generated. In the meantime, however, the previous value of the conversion factor k is used.

The received signal RS is actually demodulated in two channels within the RFID interrogator. The conversion factors k1, k2 for either channel are determined independently from each other.

The transmitted signal TS is demodulated in that it is advantageously mixed with itself but it may be first attenuated and then mixed with the phase shifted output signal of the local oscillator lo.

The communication controller circuit ccc interrupts the processing of the received signal RS while the RFID interrogator transmits data to the label 1 or receives a telegram therefrom. After the RFID interrogator has stopped transmitting data to the label 1 or receiving data therefrom the new interrogator receiving is carried on with the last determined conversion factors k1, k2 for the first and the second channel, respectively.

Said determining of the approximation of the conversion factor k by means of stepwise changing the attenuation factor AF, by which the demodulated transmitted signal TSd is attenuated, is represented in FIGS. 1a and 1b for the case of receiving the transmitted signal, which is reflected off the interrogator surroundings, consequently in the absence of an RFID label, and in FIGS. 2a and 2b for the case of also receiving the signal transmitted by the RFID label 1. A period $t_o^{AN}$ of the amplitude noise AN and a label modulation period $t_o^{LS}$ are shown.

Simulations for the demodulated transmitted signal TSd (a second window in either case) and the demodulated received signal RSd (a first window in either case) are used, actually at two phase angles $\Phi_{RS}=0$ and $\Phi_{RS}=50°$ of the carrier wave in the received signal RS with respect to the local oscillator signal.

A staircase-like time behavior $DC'_{RS}$ of the direct-current component $DC_{RS}$ as well as the alternating-current component $AC_{RS,AN}$, which originates from the amplitude noise AN, in the demodulated received signal RSd is represented in a third window in either case; said components are stepwise reduced in the normal rhythm.

One of the stairs in the time behavior $DC'_{RS}$ in FIGS. 1a and 2a approaches closest to the value zero when the attenuation factor is AF=0.5; this value AF is chosen to be the approximation for the conversion factor k, hence k=0.5. For the case of FIGS. 2a and 2b the conversion factor k is determined as k=0.3. A fast waviness of the amplitude noise AN nearly disappears at AF=0.5 in FIG. 2a and at AF=0.3 in FIG. 2b.

A possible embodiment of an interrogator integrated circuit is for carrying out said method for reducing the amplitude noise AN appearing in the signal RS received by the RFID interrogator when transmitting the radiofrequency electromagnetic sine wave is represented in FIG. 3.

The embodiment with only one antenna ia is shown. The antenna ia is connected through the directional coupler dc to an output of a transmitter amplitude modulator am, usually through a matching circuit mc and an amplifier a, as well as a first input of a first and second mixer rsm1 and rsm2, respectively, for the received signal RS. The RFID label 1 is provided with an antenna 1a.

The first output signal C of the interrogator local oscillator lo being the carrier signal is conducted to a first input of the transmitter amplitude modulator am; all output signals of the local oscillator lo have the same frequency. A modulation signal from the digital-to-analogue converter circuit dac is conducted to the second input of the transmitter amplitude modulator am.

The second and the third output signals I, Q of the local oscillator lo being in quadrature to each other are conducted to a second input of the first and the second mixer rsm1 and rsm2, respectively, for the received signal RS.

The RFID interrogator is also provided with a mixer tsm for the transmitted signal TS. Both inputs of said mixer tsm are advantageously connected to an output of the interrogator transmitter through the attenuator circuit ac and receive an attenuated transmitted signal ATS. In this case the attenuated transmitted signal ATS is mixed with itself and said phase angle $\Phi_{TS}$ equals zero.

The demodulated received signals RSd1 and RSd2 from the output of the first and the second mixer rsm1 and rsm2, respectively, mixing the received signal RS are conducted to a first input of a first and second subtractor s1, s2, respectively, to a second input of said subtractors the demodulated transmitted signal TSd from an output of the mixer tsm for the transmitted signal TS is conducted through a first and second controlled circuits ap1 and ap2, respectively, which circuits attenuate the demodulated transmitted signal TSd and set its polarity.

An alternating-current signal AC1, AC2 from a first output of the first and the second subtractor s1 and s2, respectively, is conducted in a way already described through the first and second low-pass filter f1, f2, respectively, in order to obtain the first and the second output signal O1, O2, respectively, of the interrogator receiver.

A direct-current component of the difference generated in the first and the second subtractor s1 and s2—said difference corresponds to the difference of the direct-current components $DC_{RS}$ and $DC_{TS}$ for the first and the second channel, respectively—is conducted as a direct-current signal DC1, DC2 from a second output of the first and the second subtractor s1 and s2 to a first and a second correction circuit c1 and c2, respectively. The attenuation factors AF1 and AF2 are set here. Said attenuation factors AF1 and AF2 control the first and the second controlled circuit ap1 and ap2, respectively, which attenuate the demodulated transmitted signal TSd and set its polarity. The correction circuits c1 and c2 are controlled with control signals CS1, CS2 from the communication controller circuit ccc.

The represented integrated circuit is of the RFID interrogator is provided with an amplitude noise AN eliminating circuit anec too, which delivers the conversion factors k1, k2 for either channel independently from each other by changing the attenuation factors AF1 and AF2 step by step. The amplitude noise AN eliminating circuit anec comprises the mixer tsm of the transmitted signal TS, the first and the second controlled circuit ap1, ap2, which attenuate the demodulated transmitted signal TSd and set its polarity, the first and the second subtractor s1, s2 and the first and the second correction circuit c1, c2. The circuit anec is foreseen to determine the conversion factors k1, k2 by means of stepwise increasing the attenuation factors AF1 and AF2 for the first and the second channel of the receiving circuit, respectively.

The invention claimed is:

1. Method for reducing an amplitude noise AN originating from an RFID interrogator transmitter and appearing in a signal RS received by said RFID interrogator, said method being carried out when a signal TS transmitted by the RFID interrogator is a radiofrequency electromagnetic sine wave, characterized in that a contribution $RSd_{AN}$ of said amplitude noise AN to a demodulated received signal RSd within a frequency interval of a low-pass filter at an interrogator receiver output is determined by means of a measured demodulated transmitted signal TSd as $$RSd_{AN} = k \cdot TSd$$

in that a direct-current component $DC_{RS}$ in the demodulated received signal RSd and a direct-current component $DC_{TS}$ in the demodulated transmitted signal TSd are measured and a conversion factor k is determined as $$k = DC_{RS}/DC_{TS}$$

and that a receiver output signal O is continuously generated out of the received signal RS by subtracting said contribution $RSd_{AN}$ of the amplitude noise from the demodulated received signal RSd and filtering the signal RSd−k·TSd cleaned in said way by the low-pass filter and amplifying it.

2. Method as recited in claim 1, characterized in that said contribution $RSd_{AN}$ of the amplitude noise AN is determined in a normal rhythm, whose period is at least twice a period corresponding to a medium frequency of said low-pass filter, by measuring, in the normal rhythm, the direct-current component $DC_{RS}$ in the demodulated received signal RSd and the direct-current component $DC_{TS}$ in the demodulated transmitted signal TSd and determining the conversion factor k each time as $k=DC_{RS}/DC_{TS}$ and that the receiver output signal O is continuously generated.

3. Method as recited in claim 2, characterized in that the conversion factor k is determined after the RFID interrogator has been turned on in that the demodulated transmitted signal TSd being reduced by an attenuation factor AF, which is stepwise increased in the normal rhythm, is subtracted from the demodulated received signal RSd in the normal rhythm until a direct-current component of said difference moves closest to zero and that last attenuation factor AF is thereafter retained as an approximation of the conversion factor k.

4. Method as recited in claim 3, characterized in that said attenuation factor AF is stepwise increased by 0.1 from an initial value 0.

5. Method as recited in any of claims 2 to 4, characterized in that the conversion factor k is determined in a rhythm being slower than the normal rhythm and the receiver output signal O is continuously generated, whereas the last value of the conversion factor k is used in the meantime.

6. Method as recited in any of claims 1 to 5, characterized in that the received signal RS is demodulated in two receiving channels in that it is mixed with a first output signal I of a local oscillator and with its second output signal Q being in quadrature to the first one, that the conversion factor k1, k2 for either channel is determined independently of the conversion factor for the other channel and that the stronger one of the two output signals O1, O2 in said two channels is digitized and conducted to a communication controller circuit.

7. Method as recited in claim 6, characterized in that the transmitted signal TS is demodulated in that it is mixed with itself.

8. Method as recited in claim 6, characterized in that the transmitted signal TS is demodulated in that it is mixed with a phase shifted output signal of the local oscillator.

9. Method as recited in any of claim 7 or 8, characterized in that the transmitted signal TS is attenuated before the demodulation.

10. Method as recited in any of claims 1 to 9, characterized in that a new interrogator receiving after the RFID interrogator has stopped transmitting data to a label is resumed with the last determined conversion factors k1, k2 for the first and second receiving channel, respectively.

\* \* \* \* \*